United States Patent [19]

Steinberg et al.

[11] 4,182,200
[45] Jan. 8, 1980

[54] TRANSMISSION GEAR WITH POWER BRANCHING

[75] Inventors: Hans Steinberg; Volkmar Tepper, both of Witten, Fed. Rep. of Germany

[73] Assignee: Mannesmann Aktiengesellschaft, Düsseldorf, Fed. Rep. of Germany

[21] Appl. No.: 896,142

[22] Filed: Apr. 13, 1978

[30] Foreign Application Priority Data

Aug. 31, 1977 [DE] Fed. Rep. of Germany ....... 2739596

[51] Int. Cl.² ............................................. F16H 37/06
[52] U.S. Cl. ...................................... 74/664; 74/410; 74/665 R
[58] Field of Search ............... F16H/57/00; 74/664, 74/665 R, 325, 329, 331, DIG. 2, DIG. 8, 410, 412, 413, 421 R, 665 F, 665 A; 115/34 R

[56] References Cited

U.S. PATENT DOCUMENTS

| 3,610,065 | 10/1971 | Hayashi et al. | 74/410 |
| 4,153,002 | 5/1979 | Sigg | 74/665 R X |

Primary Examiner—C. J. Husar
Assistant Examiner—Frank McKenzie
Attorney, Agent, or Firm—Smyth, Pavitt, Siegemund, Jones & Martella

[57] ABSTRACT

Fourfold power branching for each propulsion mode (forward and reverse) requires recombining on a single output shaft which is carried out via two large gears mounted separately on axially spaced hollow shafts, one being traversed by the output shaft whose end is coupled centrally to the facing ends of the two hollow shafts by two gear couplings with crowned teeth.

6 Claims, 2 Drawing Figures

(A-A)(Fig.2)

TRANSMISSION GEAR WITH POWER BRANCHING

BACKGROUND OF THE INVENTION

The present invention relates to transmission gears, particularly for ship drive and propulsion systems.

Transmission gears are, for example, constructed in that the drive shaft or input axle is drivingly coupled to a spur gear on an intermediate shaft which drives two pinions which are aligned with the intermediate shafts and are arranged to both sides of the spur gear. The pinions in turn mesh with two large gears on the output drive shaft.

The manufacture of spur gear drives is difficult for high power transmission gears such as in ship drive systems. It may well occur that the dimensions of the gears exceed the power capabilities of tooth making machines. In order to solve the problem inherent in the situation one uses frequently the principle of power branching. Specifically, the power for a ship's drive is divided into two branches by means of separate spur gears meshing the pinions which are coupled to the input shaft. Each spur gear sits on an intermediate shaft to divide further the power in the two branches in that each intermediate shaft drives two pinions. This way one obtains four branches, which, of course, have to be combined on the single output shaft. One has used here large gears on that shaft, each meshing with two of the four pinions. Such a transmission gear, operating with two cascaded power branchings and using just two large gears for driving the output shaft is quite satisfactory, but the load distribution as between the four pinions and the two large gears requires improvement. For example, in the case of a ship drive system contour changes and resilient yielding of the ship's hull is inevitable, depending on the sea, temperature, etc. so that parts of the drive system being supported at different locations are inevitably displaced in relation to each other. Also, some tolerances and initial alignment errors interfere with the power branching and the desired uniform local distribution.

DESCRIPTION OF THE INVENTION

It is the object of the present invention to improve the combining stage of a branched transmission gear and to equalize the combining of power so that the connection to the propeller shaft and inherent deformations of the load bearing foundation does not interfere with the load as locally effective as well as with the load distribution of and in the several parts of the transmission.

In accordance with the preferred embodiment of the invention, it is suggested to mount the two large gears, each meshing with one or more pinions of a power branching system, on two axially aligned hollow shafts which are individually journalled; the output shaft e.g. the propeller shaft traverses at least one of the hollow shafts and has e.g. a flange disposed in the middle between the two shafts; gear coupling means such as two gear couplings connect the flange to the two hollow shafts to combine the power branches on the output shaft. The gear couplings are preferably provided with crowned teeth.

It was found that the above mentioned position changes and shaft twistings do not detrimentally interfere with the load distribution over the width of the teeth of the large gears, nor will any load changes on the bearings. The gear couplings yield and compensate to some extent shaft angle displacements and dynamic excentricities without setting up restoring forces.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
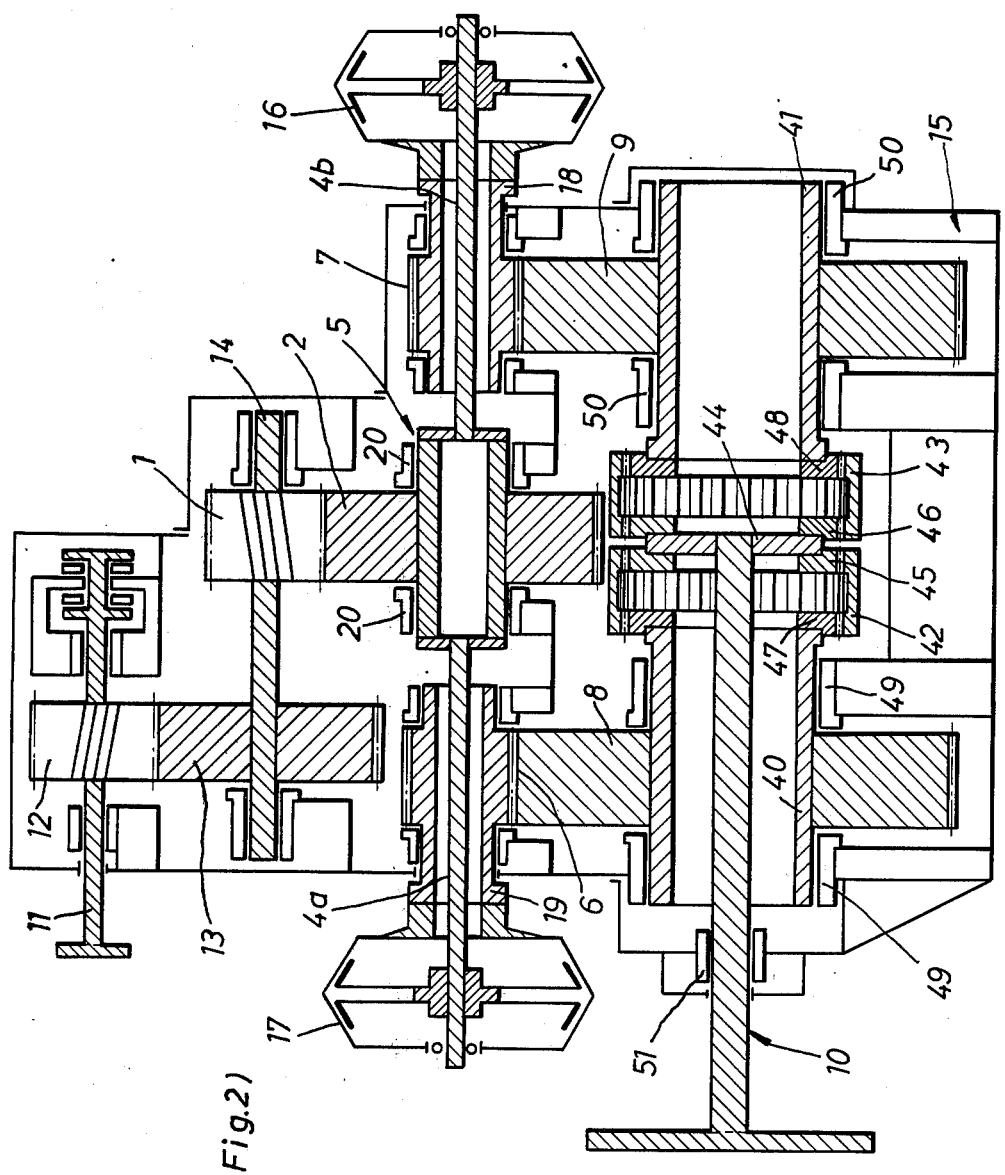
FIG. 1 is a section view through a transmission gear for a ship's drive in accordance with the preferred embodiment of the invention.

Proceeding now to the detailed description of the drawings, the figures show a reversible reducing gear with twofold power branching, i.e. power is twice branched to obtain four branches for forward as well as for reverse driving and propulsion. The forward propulsion mode uses stage V (FIG. 2) and the reverse and propulsion mode drive is carried out by stage R. The view of FIG. 2 does not show directly the first lateral branching and, therefore, appears to be similar to a system with single power branching only. The section as per FIG. 1 runs through the one branch for the forward mode transmission, the other branch, and the branches for reverse propulsion are analogously constructed as will be explained below.

The transmission gear as depicted shows an external drive shaft 11 journalled in bearings in a case or housing 15; the same is true for the other shafts of the system. A gear 12 is mounted on shaft 11 and meshes a gear 13 on a shaft 14. Shaft 14 in turn carries the driving gear 1 which (see FIG. 2) meshes two spur gears 2 and 3 which are disposed side by side.

A first intermediate shaft 5 carrying gear 2 is journalled and mounted in housing 15 by means of bearings 20; moreover, shaft 5 is hollow in its central portion but has axial end flanges. Reference numerals 4a and 4b denote rather thin extensions of the hollow portion of shaft 5; they are mounted to these end flanges. These axles 4a, 4b respectively run into clutches 17 and 16 and drive the input of these clutches.

These clutches are energized during forward propulsion and connect the intermediate shaft 5 with hollow pinions 6 and 7 being traversed by the extensions 4a, 4b of shaft 5 and being further disposed to one side and the other of spur gear 2. The pinions 6 and 7 are, therefore, driven in the forward mode and mesh large gears 8 and 9, respectively, and these large gears 8 and 9 are connected to the driven or output shaft 10 of the system by the coupling system to be described next. Gears 8 and 9 are axially aligned and respectively secured to hollow shafts 40 and 41. These hollow shafts are separately mounted in bearings 49 and 50. The driven shaft 10 e.g. a shaft that is to be connected to the propeller shaft traverses shaft 40 and ends half-way between the axial, mutually facing ends of the shafts 40 and 41. That end of shaft 10 is provided with a flange 44 to which are secured inner coupling pieces 45 and 46 having convexly contoured, bulging i.e. crowned teeth. Similar additional coupling pieces 47 and 48 are secured to the adjacent ends of shafts 40 and 41. The inner coupling pieces 45 and 47 are interconnected by a sleeve 42, and pieces 46 and 48 are interconnected by sleeve 43. These sleeves and the respective coupling pieces are elements pertaining to two gear clutches.

Figure 2:
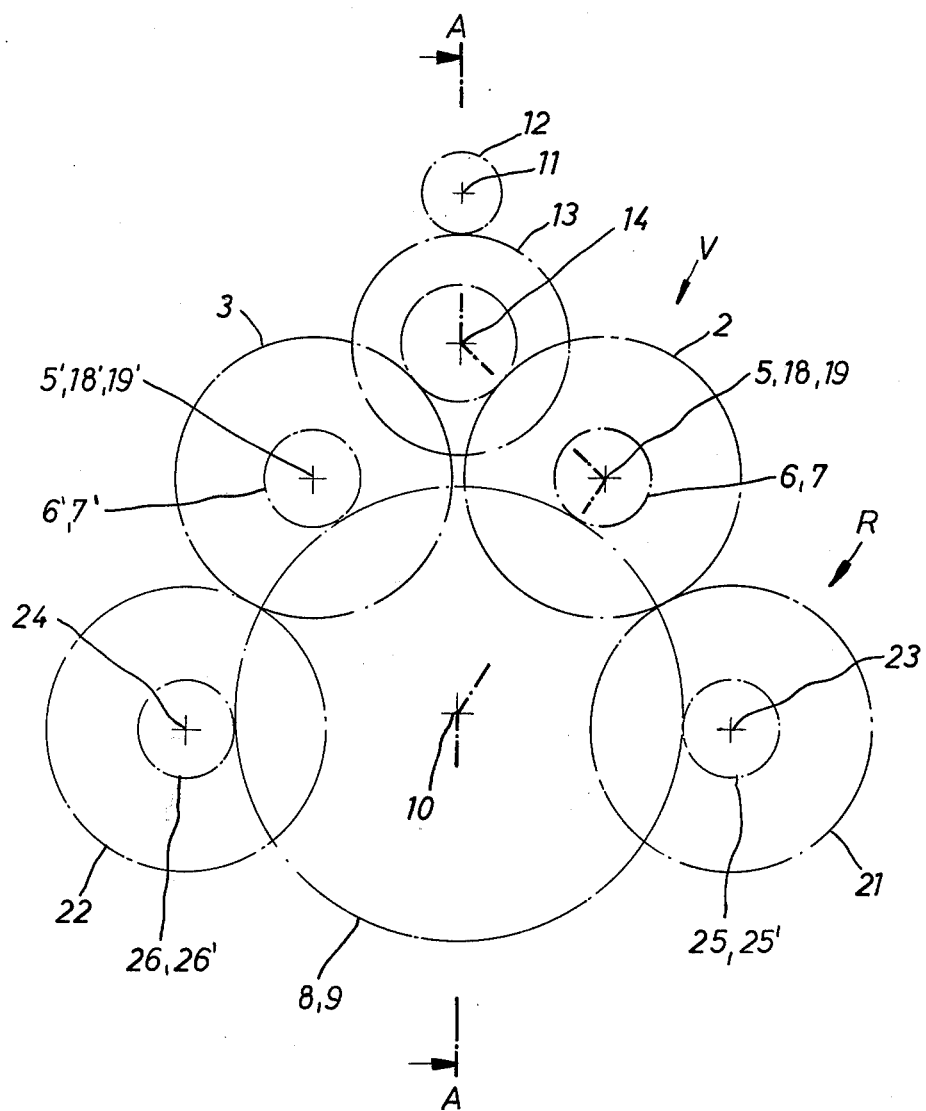
FIG. 2 is a schematic front view of that drive, showing also plane A—A in which the section of FIG. 1 has been taken.

FIG. 2 identifies the several gears by pitch circles and shafts are identified by the axes and depicted as crosses. It can readily be seen that the assembly as shown in FIG. 1 is actually present in the plurality, e.g. fourfold. Particularly stage V has a second gear 3 (in addition to gear 2) which is a second power branch and includes, as symbolically denoted a secured intermediate shaft 5', hollow shafts 18' and 19' and pinions 6',7' which also mesh with the large gears 8 and 9. That is to say large gear 8 meshes with the two pinions 6 and 6' thereby combining two branches, and large gear 9 meshes with the two pinions 7 and 7', thereby combining two other branches, and the coupling as shown in FIG. 1 provides further and final power branch combining. The hollow shaft 5' has also axial extensions traversing the hollow shafts 18', 19' and cooperating with clutches analogous to clutches 16,17.

It can thus be seen that drive shaft 11 drives the shaft 14 and pinion 1 thereon. That pinion drives the two gears 2 and 3 and the two intermediate shafts 5 and 5'. Whenever the clutches 16 and 17, as well as the second pair cooperating with shaft 5' are energized, pinions 6 and 6' drive gear 8 and pinions 7 and 7' drive gear 9. The shaft 10 will be driven for forward mode propulsion via the hollow shafts 40 and 41 and the couplings 42,43.

As far as the reverse mode is concerned, clutches 16,17 etc. are disconnected; but spur gears 2 and 3 mesh also with gears 21 and 22 thereby reversing the rotation. The gears 21,22 sit also on hollow shafts 23 and 24 (similar to 5 and 5') also having extensions such as 4a,4b cooperating with clutches analogous to 16,17, and pinions such as 18,19. These pinions are identified in FIG. 2 by 25, 25' and 26, 26'. These pinions now mesh also the two large gears 8 and 9 and drive them in two opposite directions. In other words, the entire arrangement for reverse propulsion is basically a duplication of the forward system except that reversing gears 21 and 22 are interposed.

It can readily be seen, therefore, that FIG. 1 could also be understood to depict, in substance, a section in a section plane which veers off at right angles at shaft axis 10 (FIG. 2), traverses the axis of intermediate shaft 23, runs up vertically (bypassing 2) and veers back to intercept 14. The entire system, therefore, includes four such intermediate shafts with extensions and two clutches and two pinions per intermediate shaft. All branches are combined in the double gear or gear clutch system 42,43 having, as stated, crowned teeth to prevent a feedback effect or displacement in parts tending to de-equalize the loads in the branches.

The invention is not limited to the embodiments described above but all changes and modifications thereof not constituting departures from the spirit and scope of the invention are intended to be included.

What is claimed is:

1. Heavy duty transmission gear, such as a ship's drive gear including a housing and wherein a drive shaft is drivingly connected to two branches, each branch including two coaxial pinions, the two coaxial pinions of each branch respectively meshing with two large gears, the improvement comprising:

a first and second hollow shaft journalled in said housing in coaxial alignment with each other, but axially spaced apart defining a space in between;

an output shaft also journalled in the casing and traversing one of said hollow shafts, and having one end extended into said space; and gear coupling means in said space and connecting the two hollow shafts to the output shaft.

2. Transmission gear as in claim 1, said output shaft having a flange disposed in about the middle of said space, and carrying coupling pieces pertaining to the coupling means.

3. Transmission gear as in claim 1, said coupling means including two gear couplings with crowned teeth.

4. Heavy duty transmission gear such as a ship's drive gear having a housing, a drive shaft means drivingly connecting the shaft to a spur gear on an intermediate shaft, a pair of pinions coaxial to and drivingly connected to the intermediate shaft, the improvement comprising:

a pair of relatively large gears meshing said pinions and being disposed in axial alignment with each other;

a pair of hollow shafts respectively carrying said large gears and being axially spaced from each other but mutually axially aligned;

an output shaft traversing at least one of the hollow shafts; and gear coupling means for connecting mutually facing ends of the hollow shaft to the output shaft.

5. Transmission gear as in claim 4, said output shaft having a flange disposed in about the middle of said space, and carrying coupling pieces pertaining to the coupling means.

6. Transmission as in claim 4, said coupling means including two gear couplings with crowned teeth.

* * * * *